United States Patent Office 3,206,445
Patented Sept. 14, 1965

3,206,445
VINYL AROMATIC SULFONATE POLYMERIZA-
TION PROCESS AND PRODUCT
Henry Volk, Bay City, Mich., assignor to The Dow Chemi-
cal Company, Midland, Mich., a corporation of
Delaware
No Drawing. Filed Feb. 5, 1962, Ser. No. 171,264
15 Claims. (Cl. 260—79.3)

The present invention relates to a novel process and polymeric composition. In particular, the invention concerns forming and polymerizing vinyl aromatic sulfonates in situ to provide a unique class of polyaromatic sulfonates characterized by high molecular linearity and ultrahigh molecular weights.

"Polyaromatic sulfonates," as employed herein, refers to polymeric resinous materials which correspond to polyalkane backbone polymers having integrally and chemically combined therein a plurality of vinyl aromatic sulfonate moieties.

Generally, polyaromatic sulfonates are prepared by either of two fundamentally different techniques. One technique involves sulfonating a suitable polymeric backbone, of a polyalkenyl aromatic material, with one or more sulfonating agents such as concentrated sulfuric acid, chlorosulfonic acid or sulfur trioxide, in a dispersing medium for the polymer and sulfonating agent. Though several patents teach improved sulfonation techniques, even the best of such direct sulfonation reactions usually results in some cross-linking, e.g., sulfone cross-linking, and non-uniform sulfonation of the polymer backbone. Normally, such cross-linking is manifested when the sulfonated polymer composition is dissolved or dispersed in a relatively large amount of water and there appears in the resulting solution a small amount of a gel-like phase which can be separated from the dispersed polymer by filtration.

It would be desirable to provide improved polyaromatic sulfonate compositions characterized by uniform and controlled substitution of sulfonate groups throughout linear polymer chains, which chains are substantially free of cross-linking such as sulfone cross-linking.

Another technique for preparing the polyaromatic sulfonates is to directly polymerize vinyl aromatic sulfonates. For convenience the directly polymerized vinyl aromatic sulfonates will be referred to herein by the letters PAS polymer or polymers as the case may be. This is an apparent alternate route to the preparation of such materials, but, until the present invention, it has been the repeated experience in the art that, the directly polymerized vinyl aromatic sulfonates were characterized by low degrees of polymerization, i.e., low molecular weights. The word "low" is used here in the sense of being low by comparison to the ultrahigh molecular weight polymer sulfonates prepared in accordance with the invention.

It is a principal object of the present invention to provide a novel process for the preparation of directly polymerized vinyl aromatic sulfonates. Especially, it is an object to provide a method whereby ultrahigh molecular weight PAS polymers are prepared. A further object is to provide PAS polymers characterized by high molecular linearity. Still another object is to provide novel compositions characterized by unique and exceptionally advantageous capabilities in aqueous systems as flocculents, thickeners and the like. Other objects will become apparent hereinafter as the invention is more fully described.

In accordance with the invention, a most efficacious method is provided for the production of polymerized vinyl aromatic sulfonates corresponding to vinyl polymerization products of a monomer composition characterized by the formula:

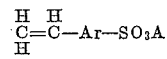

wherein Ar is a divalent monocyclic aromatic radical of the benzene series having its valences on nuclear, i.e., ring, carbons, and A is an alkali metal.

The aforesaid method comprises the following operations. Charged to a suitable enclosed reaction system are water and a precursor of the above described monomer which can be characterized by the formula:

wherein X is chlorine or bromine, M is hydrogen or any water-soluble, monovalent, salt-forming cation and Ar is the same moiety as described above. The relative proportions of water and monomer precursor used can vary within the overall range of about 3 to about 50 parts of the former for each part of the latter. Preferably, the ratio is from about 4 to 8 parts of water for each part of the monomer precursor.

Also charged to the reaction system is an alkali metal hydroxide, e.g., lithium, sodium or potassium hydroxide or mixtures thereof. The amount thereof used is sufficient to react stoichiometrically with the charged monomer precursor and to provide, in addition, a small excess thereof adequate to maintain the reaction system throughout the reaction at a pH of at least about 11, preferably at least about 12.

Usually, it is most convenient to add the amount of the precursor and alkali metal hydroxide to the reaction system in the form of an aqueous solution. Water incorporated into the reaction system therewith is to be considered as a portion of the water to be charged as discussed above.

The excess alkali hydroxide used to maintain the reaction system at the specified pH level throughout the reaction will vary within the range from about 0.2 to about 20 percent based on the weight of the monomer precursor. For best results, the excess alkali metal hydroxide should be within the upper regions of the aforementioned range when lower concentrations of the monomer precursor are used and vice versa when higher concentrations of the monomer precursor are used. What this means, is that having established a desired set of operating conditions yielding good results, comparable results can be expected by adjusting the composition of the charged reaction system in a manner such that with any changes in the amount of monomer precursor charged (the amount of water remaining constant), the amount of excess alkali metal hydroxide used is also adjusted in an amount approximately inversely proportional to the change in the amount of monomer precursor.

When the monomer precursor is an alkali metal β-haloethyl aromatic sulfonate, the chemical stoichiometry for the reaction is one mole of alkali metal hydroxide for each mole of the precursor. The stoichiometry for the β-haloethyl aromatic sulfonic acids and other monovalent salts thereof, such as the ammonium salts, is 2 moles of the basic alkali compound for each mole of the monomer precursor.

In carrying out the polymerization, oxygen in and above the reaction system is removed, as, for example, by subjecting it to a vacuum or by purging it with an inert gas such as nitrogen. Oxygen is removed from the reaction system until the atmosphere above it contains less than about 1.5 percent by weight oxygen. This step can be carried out at any convenient point during the charging of the reaction system, but it is usually accomplished subsequent thereto. The temperature of the reaction system is initially increased to an effective level within the range from about 40° up to about 100° C. After a short period, e.g., up to about four hours, preferably at a higher temperature within the aforesaid range, dehydrohalogenation of the β-haloethyl substituent of the monomer precursor is substantially complete. As dehydrohalogenation occurs, the monomer formed begins to polymerize in situ. Such polymerization is believed to be promoted by the small amounts of oxygen remaining in the deaerated system or by such amounts of oxygen as naturally occur in the nitrogen, or other inert gases employed for purging purposes.

It has been shown, for example, in experiments connected with the present invention that oxygen contents in the purging gas of as little as 5 parts per million cause effective initiation of the polymerization reaction. The presence of amounts of oxygen such as are encountered by the reaction system when it is contacted with air terminates the polymerization reaction.

Though it is desirable, at least while the dehydrohalogenation is occurring, to subject the reaction system to the above-mentioned higher temperatures, the polymerization reaction can be completed at substantially lower temperatures.

The lower temperature limit for the polymerization reaction is not critical. It is determined only by practical considerations as to desirable polymerization rates and, in light of such considerations, can be a temperature anywhere from about room temperature or below to as low as about 0° C. up to a maximum of about 100° C., preferably within the range from about 50° to 85° C. While the higher temperatures promote a higher rate of reaction, there is also propensity for the ultrahigh molecular weight polymerized product to undergo degradation.

Another mode of operation involves first carrying out the dehydrohalogenation reaction and thereafter, preferably immediately thereafter, purging the reaction system with an inert gas so as to reduce the oxygen content below the specified level, at which polymerization can be initiated.

Although it is not required for operability, it is preferred to employ a free radical generating means to initiate the polymerization reaction. The free radicals may be those formed by radiation such as actinic light or high energy radiation including gamma rays obtained from cobalt 60 sources or fission products, high energy electrons supplied by a betatron or high voltage electron accelerator, X-rays and the like. From the standpoint of convenience, however, it is preferred to employ small but effective amounts of a free radical-forming, chemical catalyst. Addition of such a catalyst is suitably accomplished by adding small aliquot portions of the total amount of catalyst desired at frequent intervals throughout the polymerization reaction. The maximum amount of free radical-forming catalyst that can be used is about 0.01 percent by weight based on the weight of the monomer precursor.

Chemical, free radical-forming catalysts can include any organic or inorganic material, which in an aqueous system, upon heating or contact with another chemical yields free radicals. Examples of such materials are the inorganic peroxides such as hydrogen peroxide, barium peroxide, inter alia and the various organic peroxy catalysts, such as the dialkyl peroxides of which examples are diethyl peroxide, dipropyl peroxide, dilauryl peroxide, dioleyl peroxide, distearyl peroxide, di-tertiary-butyl peroxide, di-tertiary-amyl peroxide and the like. Other suitable peroxides include alkyl hydrogen peroxides, e.g., tertiary butyl hydrogen peroxide, acetyl peroxide, propionyl peroxide, lauroyl peroxide and the like. Examples of other catalysts include cumene hydroperoxide, tertiary butyl perbenzoate and urea peroxide. Also operative are salts of inorganic peracids such as sodium persulfate, potassium persulfate, sodium percarbonate, potassium percarbonate, sodium perborate, potassium perborate, sodium perphosphate, potassium perphosphate, inter alia.

Water-soluble activators that can be employed in conjunction with the above peroxide catalysts include sulfur dioxide, the alkali metal bisulfites, hydrosulfites, thiosulfates, alkali metal sulfites, ethylsulfite and the like organic and inorganic compounds which are capable of undergoing oxidation.

To produce the desired ultrahigh molecular weight, linear, PAS polymers of the invention, it is usually necessary to maintain the reaction system under polymerizing conditions for a long enough period of time to achieve a conversion of at least about 45 percent of the monomer precursor to the polymeric product. Optimum conversions are in the range from 80 to 95 percent.

The reaction times necessary to achieve this end will vary according to the monomer precursor concentration employed, the temperature utilized and the particular ultrahigh molecular weight desired. While shorter reaction times can be utilized under forcing conditions, e.g., higher temperatures and higher monomer precursor concentrations within the aforementioned critical limits, effective results are normally achieved with reaction times ranging anywhere from about 5 to as much as 60 or more hours.

Upon completion of the polymerization reaction, the PAS polymer can be recovered by means of conventional separatory techniques. An example of such techniques is precipitating the polymeric product with a non-solvent which may be a water-miscible organic liquid such as the lower aliphatic alcohols, esters or ketones or mixtures thereof with water. Illustratively, the reaction mass is poured into methanol wherein soluble unreacted materials and reaction by-products are maintained in solution as the polymeric products precipitate. Other methods for separating the polymerized products from the reaction medium involve dialysis or electrodialysis of the reaction mass followed by spray or drum-drying operations, with or without additional leaching of the PAS polymer product with a liquid alcohol or alcohol water mixture to remove soluble impurities.

Techniques for the preparation of the monomer precursor are known in the art. Usually, the preparative route involves hydrohalogenation of a vinyl aromatic compound employing a catalyst for anti-Markownikoff addition of the hydrogen halide. Examples of such catalysts are peroxides, actinic light and high energy radiation. The resulting β-haloethyl aromatic compound is then reacted with a sulfonating agent such as sulfur trioxide or chlorosulfonic acid to provide the corresponding β-haloethyl aromatic sulfonic acid or sulfonyl chloride which are usually reacted with an alkali metal hydroxide to provide the corresponding organic-sulfonate salt. A reference showing techniques for preparing such β-haloethyl aromatic sulfonate compounds is U.S. Patent 2,821,549.

The monomer precursors are exemplified by such monocyclic aromatic compounds of the benzene series as sodium beta-chloroethylphenyl sulfonate, potassium beta-bromoethylphenyl sulfonate, sodium ortho-, meta- and para-(beta-chloroethyl) tolyl sulfonates, sodium ortho-, meta- and para-(beta-bromoethyl) tolyl sulfonates, ammonium ar-(beta-bromoethyl) ethylphenyl sulfonate, potassium ar-(beta-bromoethyl) xylyl sulfonate, sodium ar-(beta-bromoethyl) methoxyphenyl sulfonate, sodium ar-(beta-bromoethyl) butoxyphenyl sulfonate, ar-(beta-bromoethyl) diethoxyphenyl sulfonic acid, ar-(beta-chloroethyl) chlorophenyl sulfonic acid, ar-(beta-bromoethyl) chlorophenyl sulfonic acid, ar-(beta-bromoethyl) bromophenyl sulfonic acid, and water-soluble salts of the foregoing acids.

The particular monovalent salt form of the monomer precursor used is immaterial so long as the salt form of the monomer precursor is water-soluble. Monovalent salt forms that may be used include metal and organic salts such as the alkali metal, ammonium, substituted ammonium, amine and the like water-soluble salt forms. The amines includes for example, primary, secondary and tertiary alkylamines wherein the alkyl may have from 1 to 4 carbons. When a salt form of the monomer precursor is prepared from a weaker base than the alkali metal hydroxide employed in the invention, the former is converted to the salt form of the latter by a displacement reaction occurring upon contact of the reagents.

The ultrahigh molecular weight PAS polymers of this invention are characterized by estimated weight average molecular weights of from about 3.5 up to 12 million or more based on the Stadinger technique for molecular weight determination. These figures correspond to what is characterized herein as a reduced viscosity number rang of from about 17 to about 52 respectively. Reduced viscosity ($N_r$) is defined by the following formula:

$$N_r = [(T/To) - 1]/C$$

wherein C is the concentration of the polymer sulfonate in grams per hundred milliliters of an aqueous 0.5 N sodium chloride solution and for the purposes herein C is to be taken as 0.4, T is the flow time of the above sodium chloride solution having dissolved therein 0.4 gram of the polysulfonate and To is the flow time of the aqueous 0.5 N sodium chloride solution, said flow times being obtained with an Ostwald viscosimeter at 30° C.

PAS polymers described herein are characterized by exceptional utilities as flocculents, additaments to water for firt fighting uses and the like uses. In such applications, the polymers exhibit surprising and heretofore unknown efficaciousness. The following examples serve to illustrate the methods and compositions of the invention.

EXAMPLE 1

A one liter enclosed flask equipped with a stirrer and sparging means was charged with 900 grams of an aqueous solution containing 158 grams of 2-bromoethylbenzene sulfonic acid and 4.2 grams of sulfuric acid. The sulfuric acid was incorporated into the charge as an impurity in the 2-bromoethylbenzene sulfonic acid. To this solution was added a chemically stoichiometric amount of sodium hydroxide (enough to neutralize the sulfuric acid and aromatic sulfonic acids and to dehydrohalogenate the $\beta$-bromoethyl group) and, in addition, an excess thereof (0.2 mole) sufficient to insure a pH of about 12 throughout the reaction. The total amount of caustic added was 59 grams.

The charged reaction system was sparged with nitrogen for 15 min. and heated to a temperature of about 76° C. whereby the dehydrohalogenation of the monomer precursor and polymerization of the monomer thus formed were begun. During the course of the reaction, nitrogen containing about 50 parts per million of oxygen was continuously sparged into the reaction mass at a rate of about 17 cc./min., S.T.P. The reaction was continued under these conditions for a period of 91 hours after which the reaction mass was exposed to the atmosphere to terminate the polymerization reaction.

Conversion of monomer precursor to polymer was determined to be about 81.5 percent of the initially charged precursor. In computing this conversion, the monomer formed was calculated from data obtained by titration of the reaction mass for sodium bromide formed as by-product of the dehydrohalogenation reaction. Residual monomer after polymerization was ascertained by means of a standard bromate-bromide titration for double bonds.

The PAS polymer (sodium polystyrene sulfonate) was recovered by pouring the reaction mass into ethanol wherein the polymer was precipitated. Separation of the polymer solids was effected by filtration. The reduced viscosity number of the polystyrene sulfonate was determined as hereinbefore described to be 26.6. This number corresponds to an estimated weight average molecular weight (based on light scattering data) of about 5.4 million.

EXAMPLE 2

An ultrahigh molecular weight PAS polymer was prepared according to the invention employing an added free radical catalyst. The procedure involved charging to an air tight 300 gallon, glass-lined autoclave, equipped with a stirrer, 480 pounds of 2-bromoethylbenzene sulfonic acid, 10 pounds of sulfuric acid existing as an impurity in the sulfonic acid and sufficient water to provide a 13 percent by weight solution of the monomer precursor. The aqueous solution was then deaerated by subjecting it to a vacuum and releasing the vacuum with nitrogen. Next, deaerated, 50 percent aqueous sodium hydroxide was added to the reaction system in an amount sufficient to provide 2 moles of caustic for each mole of the monomer precursor present and a sufficient excess thereof to insure a solution pH within the range from about 13.6 to 12.2. The total amount of sodium hydroxide added was 170 pounds. The excess caustic was about 3.8 percent based on the weight of the monomer precursor charged.

The reaction mass was again sparged with nitrogen containing 50 parts per million oxygen until the oxygen content of the exhausting gas was below 100 parts per million. At this point the reaction system was heated at a temperature of about 63° C. During the course of the ensuing dehydrohalogenation-polymerization reaction, 4.1 grams of sodium persulfate was added to the reaction mass in small portions at intervals of several hours throughout the entire reaction period of 30 hours. Also during the reaction, nitrogen was continuously sparged through the reaction mass at a rate of about 0.4 cubic foot per minute. After achieving a conversion of monomer precursor to polymer of about 79 percent, the reaction vessel contents were exposed to air thereby ending effective polymerization.

The polystyrene sulfonate thus prepared was recovered by precipitating it in ethanol. The polymer was subjected to measurements whereby its reduced viscosity number was determined to be 40 which corresponds to an estimated weight average molecular weight of about 8.1 million.

EXAMPLE 3

(Utility)

To one 100 milliliter aliquot of a 5 percent aqueous suspension of Peabody coal fines (325 mesh) contained in a 100 milliliter graduate, was added an amount of an ultrahigh molecular weight sodium polystyrene sulfonate sufficient to provide 0.2 pound of the polymer per ton of coal fines. To an identical aliquot of the suspension was added a like amount of another lower molecular weight sodium polystyrene sulfonate. The polymer sulfonates had reduced viscosities of 30 and 0.6 corresponding to estimated molecular weights of about 5.9 and 0.1 million, respectively. After addition of the polymer to each aliquot, the time required for the suspension-clear supernatant interface to settle to the 40 millimeter level was 125 and 600 seconds, respectively.

EXAMPLE 4

(Contrast with prior art)

The following operations indicate the substantial uniformity and essential molecular linearity of the ultrahigh molecular weight PAS polymers of the invention as compared in these respects to heretofore known polyaromatic sulfonates.

An ultrahigh molecular weight, linear, homopolymer of styrene sulfonic acid of the invention, hereinafter designated PAS polymer "A," having a reduced viscosity number of 37 centipoises (this corresponds to an estimated weight average molecular weight of about 7.5 million) was dissolved in a 3 percent aqueous solution of sodium chloride. The amount of the polymer dissolved was sufficient to provide 0.04 percent polymer solids based on the weight of the solution.

A solution similar in concentration to the foregoing was prepared from a high molecular weight sulfonated polyvinyltoluene, hereinafter designated sulfonated polymer "B." This material had been prepared by sulfonating an emulsion polymerized high molecular weight polyvinyltoluene with sulfur trioxide in the presence of an inert solvent. The sulfonation technique employed was essentially that of U.S. Patent 2,691,644. The polyvinyltoluene used had an estimated molecular weight of about 4.5 million which, after approximately 100 percent sulfonation, i.e., one sulfonate group per combined monomer moiety, yielded a polyaromatic sulfonate of about 7.5 million molecular weight. This material is believed to be one of the more linear types of the prior art polyaromatic sulfonates.

The viscosities of the polymer solutions were determined with an Ostwald viscosimeter at 25° C. Thereafter, the solutions were filtered through a 1.2 micron millipore filter under a pressure of 100 pounds per square inch. During the filtration operation, the quantities of filtrate obtained after specified periods of time and the average flow rate were recorded. Subsequent to filtration, the viscosities of the polymer solutions were again determined in an identical manner to that employed above. The results of the foregoing operation, including computed average flow rates and retained viscosities for the two polymers, are reported in the following table.

TABLE 1

| Initial Solution [1] | PAS Polymer "A" | Sulfonated Polymer "B" |
|---|---|---|
| Viscosity (cps.) | 1.37 | 1.17 |
| Volume Filtrate, 2 minutes | 1.5 | 1.3 |
| Volume Filtrate, 3 minutes | 2.1 | 1.6 |
| Volume Filtrate, 4 minutes | 2.8 | 1.8 |
| Volume Filtrate, 5 minutes | 3.4 | 2.0 |
| Volume Filtrate, 11 minutes | 6.5 | 2.8 |
| Volume Filtrate, 12 minutes | 7.0 | 2.9 |
| Filtrate Viscosity cps. [2] | 1.33 | 1.05 |
| Percent Retained Viscosity | 97 | 89.6 |

[1] Solution consisted of 0.04 percent polymer solids in 3 percent sodium chloride.
[2] Obtained upon average sample of the total filtrate collected.

EXAMPLE 5

(*Comparative utility*)

This example shows the efficaciousness of the ultrahigh molecular weight PAS polymers of the invention as flocculents for clayey dispersions. A finely ground Michigan bentonite clay was suspended in water with vigorous stirring to produce a stock aqueous suspension thereof. Thirty milliliter aliquots of the stock suspension were placed in a standard 100 milliliter graduate. Amounts of the PAS polymer "A" and the sulfonated polymer "B" of Example 4 were dissolved in separate portions of water to provide solutions having 0.05 percent by weight polymer solids. Each of the resulting solutions was thereafter added in controlled amounts to separate aliquots of the stock bentonite suspension contained in 100 milliliter graduates. Upon completion of the addition the mixtures were agitated by inverting the graduates and returning them to their normal upright position. Thereafter, the volume of sedimented solids in each graduate was recorded at various time intervals. These data were converted into settling rates in inches per minute and are reported below.

TABLE 2

| | Milliliters of 0.05% Polysulfonate Solution | Lbs. Polysulfonate Per Ton of Clay | Settling Rates, In./Min. |
|---|---|---|---|
| PAS Polymer "A" | 0.15 | 0.015 | 1.66 |
| Do | 0.20 | 0.020 | 1.86 |
| Do | 0.30 | 0.03 | 4.75 |
| Sulfonated Polymer "B" | 0.5 | 0.05 | 1.20 |
| Do | 1.0 | 0.10 | 2.0 |
| Do | 2.0 | 0.20 | 4.42 |

In the above, it will be observed that loadings of the sulfonated polymer "B" of anywhere from 3 to 6 times that employed for PAS polymer "A" are needed to provide proximate results.

EXAMPLE 6

(*Comparative utility*)

This example concerns a showing of the uniqueness of the ultrahigh molecular weight PAS polymers of the invention by virtue of their distinct and unexpected activities in aqueous solutions for fire fighting.

In the test operation, small amounts of various polyaromatic sulfonates were dissolved in water to be utilized in fire fighting. The test fires utilized were situated on a suitable platform at the center of a ventilated room and positioned so that streams of water could be directed thereon from four surrounding fixed nozzles. Each test fire was started in identical stacks of California clear pine wood and permitted to burn for a specified "preburn time." The fires were then put out by spraying them with the polymer solutions, each of which contained enough of the polyaromatic sulfonate used to provide a solution having a Brookfield viscosity of 3.5 centipoises as measured with a Brookfield viscosimeter employing a No. 1 spindle rotated at 60 r.p.m.

In one run, the polyaromatic sulfonate composition employed was a sulfonated polyvinyltoluene similar to polysulfonate composition "B" of Example 4 but having a molecular weight of about 9 million.

In a second run, the polymer employed was an ultrahigh molecular weight polystyrene sulfonate prepared in accordance with the present invention having a reduced viscosity number of about 30, which corresponds to an estimated molecular weight of about 6.0 million.

After a preburn time of 8 minutes, initial extinguishment times for 2 runs employing the sulfonated polyvinyltoluene were about 5.4 and 6.2 minutes, respectively. Extinguishment times obtained with the water containing the ultrahigh molecular weight PAS polymer under identical conditions were 1.7 and 2.0 minutes, respectively. Water employed alone without either of the foregoing additaments requires more than 7 minutes to achieve initial extinguishment.

EXAMPLE 7

(*Evidence of linearity*)

Experiments were carried out to obtain flow index ratios characterizing the PAS polymers of the invention. The experiments were based upon the fact that solutions of these polymers exhibit rheological behavior characteristic of pseudo plastic, non-Newtonian liquids. The more the properties of a liquid represent a departure from Newtonian behavior, the more the viscosity of the liquid is dependent upon the rate of shear in addition to the usual viscosity factors such as temperature and pressure. Such "non-Newtonian" liquids, whose shear stress at a constant shear rate is time independent and which are pseudo plastic in nature, can be characterized by the equation:

$$S = Kr^n$$

wherein K is a consistency index constant, $n$ is a flow behavior index (a measure of the degree of non-Newtonian behavior), $r$ is the rate of shear and S is the shear stress.

Utilizing the above formula, a flow index ratio was computed for solutions of the polymers according to the formula:

$$n_b/n_w$$

wherein $n_b$ refers to the flow behavior index of a neutral solution of 0.25 percent by weight active PAS polymer in 3 percent aqueous sodium chloride and $n_w$ refers to the flow behavior index of a neutral solution of 0.25 percent by weight active PAS polymer in deionized water.

It is known that when a high molecular weight, linear, polyaromatic sulfonate is dissolved in a concentrated salt solution there is a tendency for it to shrink or coil up. As the polymer molecules become more compact, the solution tends to become more Newtonian in its flow behavior. The flow index ratio, i.e., the flow behavior index of the polymer in a salt solution divided by the flow behavior index of the polymer in water, therefore, correlates with the extensivity or non-extensivity of the dissolved polymer molecules in the presence of salts. Thus, a flow index ratio for a pseudo plastic-non-Newtonian liquid that approaches the numerical value of 1.0, indicates the polymer solute has low extensibility. This property is usually the result of cross-linking in the polymer. On the other hand, higher flow index ratios indicate higher degrees of salt sensitivity or extensibility in solution and, consequently, higher degrees of molecular linearity. For purposes herein, solutions of 0.25 percent by weight of a polyaromatic sulfonate in deionized water, which solutions exhibit a flow behavior index below at least about 0.8, will be considered pseudo plastic-non-Newtonian liquids.

Flow behavior index numbers were evaluated by measuring the slope of a shear rate-shear stress plot for the polymer solutions described above on log-log graph paper. The specific shear stress-shear rate data were obtained for the polymer solutions on a Fann viscosimeter at 25° C. after adjusting the pH of the solution to about 7 with one molar sulfuric acid or one molar sodium hydroxide acid as needed. The applied shear stress (pounds 100 square feet) vs. the shear rate (1/seconds) was plotted and the slope (flow behavior index) of the graph thus prepared was ascertained for each polymer solution. These flow index numbers were then used to compute the flow index ratio ($n_b/n_w$). Results of several runs are reported in the following Table 3. Also reported, is a flow index ratio determination for a sulfonated polymer of the prior art. This determination was carried out in a manner identical to that employed for the PAS polymers.

TABLE 3

| Polymer | Mol. Wt.[1] (Millions) | Reduced Viscosity Number | $n_b$ | $n_w$ | $n_b/n_w$ |
|---|---|---|---|---|---|
| SPSS [2] | 6 | 29.6 | 0.76 | 0.39 | 2.0 |
| SPSS | 4 | 19.8 | 0.68 | 0.31 | 2.2 |
| SPSS | 6.5 | 32.1 | 0.62 | 0.33 | 1.9 |
| SPSS | 7.9 | 39 | 0.69 | 0.36 | 1.9 |
| SPVT [3] | 5-8 | | 0.81 | 0.63 | 1.3 |

[1] Estimated molecular weights.
[2] Sodium polystyrene sulfonate of the invention.
[3] Sulfonated polyvinyltoluene of the prior art.

The ultrahigh molecular weight polymer sulfonates of the present invention are generally characterized by flow index ratios of at least about 1.8 and up to as much as about 2.5 or more. The highest flow index ratios obtained for certain sulfonated polyvinyltoluenes of a comparable molecular weight that were believed to be highly linear by prior art standards were about 1.5. The prior art polyaromatic sulfonates were usually characterized by flow index ratios within the range from about 1.1 up to about 1.3.

In a manner similar to that of the foregoing other ultrahigh molecular weight polymer sulfonates characterized by molecular linearity can be prepared by substituting for the β-bromoethylbenzene sulfonic acid employed in Examples 1 and 2 such other monomer precursors as specifically enumerated hereinbefore.

What is claimed is:
1. A method which comprises the steps of:
    (1) charging to a reaction system
        (a) a monomer precursor having the formula:

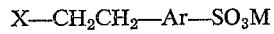

wherein X is selected from the group consisting of chlorine and bromine, Ar is a divalent monocyclic aromatic radical of the benzene series having its valences on nuclear carbons and M is selected from the group consisting of hydrogen and monovalent, water-soluble salt forming cations,
        (b) an amount of water sufficient to provide from about 3 to about 50 parts of water for each part of the monomer precursor,
        (c) a chemically stoichiometric amount of an alkali metal hydroxide, and
        (d) an excess of the alkali metal hydroxide sufficient to maintain the reaction system throughout the reaction at a pH of at least about 11;
    (2) removing oxygen from the reaction system until the amount of oxygen present is reduced below about 1.5 percent by weight of the atmosphere above the system; and
    (3) subjecting the reaction system to a temperature within the range from about 40° to about 100° C. for a period of time sufficient to effectively accomplish dehydrohalogenation of the precursor and thereafter at a temperature within the range from about 0° up to about 100° C. whereby at least a substantial proportion of the monomer precursor is converted to a water-soluble polymer characterized by high molecular linearity.

2. A method as in claim 1 wherein the reaction is continued until at least 45 percent of the monomer precursor charged is converted to a polymeric product.

3. A method as in claim 1 wherein there is added the step of separating the polymeric product from the reaction mass.

4. A process as in claim 1 wherein the reaction mass is subjected to vinyl polymerization initiating means after removal of the oxygen from the reaction system as specified.

5. A process as in claim 1 wherein there is added to the reaction system up to about 0.01 percent by weight, based on the weight of the monomer precursor charged, of a free radical forming, water-soluble catalyst.

6. A method which comprises the steps of:
    (1) charging to a reaction system
        (a) an alkali metal β-bromoethylbenzene sulfonate,
        (b) an amount of water sufficient to provide from about 3 to about 50 parts of water for each part of the β-bromoethylbenzene sulfonate,
        (c) a chemically stoichiometric amount of an alkali metal hydroxide, and
        (d) an excess of the alkali metal hydroxide sufficient to maintain the reaction system throughout the reaction at a pH of at least about 11;
    (2) removing oxygen from the reaction system until the amount of oxygen present is reduced below about 1.5 percent by weight of the atmosphere above the system; and
    (3) subjecting the reaction system to a temperature from about 40° to about 100° C. for a period of time sufficient to effectively accomplish dehydrohalogenation of the β-bromoethylbenzene sulfonate and thereafter at a temperature within a range from about 0° up to about 100° C. whereby at least a substantial proportion of the β-bromoethylbenzene sulfonate is converted to a water-soluble, alkali metal polystyrene sulfonate characterized by high molecular linearity.

7. A method as in claim 6 wherein the reaction is continued until at least about 45 percent of the β-bromoethylbenzene sulfonate charge is converted to a polymeric product.

8. A method as in claim 6 wherein there is added a step of separating the alkali metal polystyrene sulfonate from the reaction mass.

9. A process as in claim 6 wherein the reaction mass is subjected to vinyl polymerization initiating means after removal of the oxygen from the reaction system as specified.

10. A process as in claim 6 wherein there is added to the reaction system up to about 0.01 percent by weight, based on the weight of the β-bromoethylbenzene sulfonate charged, of a free radical forming, water-soluble catalyst.

11. A process as in claim 6 wherein the excess alkali metal hydroxide is from about 0.2 to about 20 percent by weight, based on the weight of the monomer precursor.

12. An ultrahigh molecular weight polymerized aromatic sulfonate characterized by high molecular linearity corresponding to a vinyl polymerization product of a monomer having a general formula:

wherein Ar is a divalent monocyclic aromatic radical of the benzene series having its valences on nuclear carbons and A is an alkali metal, said polymer being characterized by a reduced viscosity number within the range from about 17 to about 52 and a flow index ratio of at least 1.8.

13. An alkali metal polystyrene sulfonate characterized by reduced viscosity number within the range from about 17 to about 52 and a flow index ratio of at least 1.8.

14. An alkali metal polyvinyltoluene sulfonate characterized by reduced viscosity number within the range from about 17 to about 52 and a flow index ratio of at least 1.8.

15. Sodium polystyrene sulfonate characterized by a reduced viscosity number within the range from about 17 to about 52 and a flow index ratio of at least 1.8.

References Cited by the Examiner

UNITED STATES PATENTS

| | | | |
|---|---|---|---|
| 2,678,947 | 5/54 | Jones | 260—505 |
| 2,691,644 | 10/54 | Roth | 260—79.3 |
| 2,821,549 | 1/58 | Mock | 260—79.3 |
| 2,837,500 | 6/58 | Andres et al. | 260—79.3 |
| 3,022,172 | 2/62 | Ohba et al. | 260—79.3 |
| 3,067,161 | 12/62 | Roth | 260—79.3 |
| 3,079,430 | 2/63 | Goodshaw et al. | 260—505 |

WILLIAM H. SHORT, *Primary Examiner.*

JOSEPH R. LIBERMAN, *Examiner.*